(12) United States Patent
Liu et al.

(10) Patent No.: US 11,729,112 B2
(45) Date of Patent: Aug. 15, 2023

(54) METHOD AND APPARATUS FOR ALLOCATING ELECTRONIC RESOURCE

(71) Applicant: BEIJING DAJIA INTERNET INFORMATION TECHNOLOGY CO., LTD., Beijing (CN)

(72) Inventors: Qiyu Liu, Beijing (CN); Yang Zhang, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 141 days.

(21) Appl. No.: 17/472,425

(22) Filed: Sep. 10, 2021

(65) Prior Publication Data

US 2022/0094642 A1 Mar. 24, 2022

(30) Foreign Application Priority Data

Sep. 22, 2020 (CN) .......................... 202011005444.6

(51) Int. Cl.
*H04L 47/78* (2022.01)
*H04L 47/762* (2022.01)
*H04L 47/70* (2022.01)

(52) U.S. Cl.
CPC .......... *H04L 47/781* (2013.01); *H04L 47/762* (2013.01); *H04L 47/821* (2013.01); *H04L 47/822* (2013.01); *H04L 47/826* (2013.01)

(58) Field of Classification Search
CPC ... H04L 47/781; H04L 47/762; H04L 47/821; H04L 47/822; H04N 21/2187;
(Continued)

(56) References Cited

U.S. PATENT DOCUMENTS

2018/0349964 A1* 12/2018 Schellenberger ..... H04L 47/822
2020/0053411 A1* 2/2020 Yamagishi ....... H04N 21/26258
(Continued)

FOREIGN PATENT DOCUMENTS

| CN | 101802855 A | 8/2010 |
| CN | 106846032 A | 6/2017 |

(Continued)

OTHER PUBLICATIONS

First Office Action issued by the State Intellectual Property Office of People's Republic of China dated Mar. 1, 2022, 16 pages, for Chinese Patent Application No. 202011005444.6.

(Continued)

*Primary Examiner* — Michael A Keller
*Assistant Examiner* — Thao D Duong
(74) *Attorney, Agent, or Firm* — Foley & Lardner LLP

(57) ABSTRACT

The present disclosure relate to allocating electronic resources. In some arrangements, a server configures allocable electronic resources for a live streaming room in response to receiving a first configuration request from a first client. The first configuration request is configured to indicate a first configuration operation performed by an anchor to the live streaming room, and the allocable electronic resources are associated to a target commodity corresponding to the live streaming room. The server acquires an allocation request sent by a second client, wherein the allocation request is triggered by an interactive operation of an audience of the second client in the live streaming room. The server allocates an electronic resource from the allocable electronic resources to the audience of the second client, in response to the allocation request, wherein the allocated electronic resource is used by the audience for completing an order operation about the target commodity.

19 Claims, 5 Drawing Sheets

(58) Field of Classification Search
CPC ......... H04N 21/2393; H04N 21/47815; H04N 21/485; H04N 21/4882
See application file for complete search history.

(56) References Cited

U.S. PATENT DOCUMENTS

| | | | |
|---|---|---|---|
| 2020/0267094 A1* | 8/2020 | Maruyama | H04L 67/563 |
| 2020/0322412 A1* | 10/2020 | Kellicker | H04L 65/762 |
| 2020/0374238 A1* | 11/2020 | Momchilov | H04L 47/2458 |
| 2021/0126984 A1* | 4/2021 | Parekh | H04L 67/60 |
| 2022/0075825 A1* | 3/2022 | Helms | G06Q 40/02 |
| 2022/0078149 A1* | 3/2022 | Hines | H04L 63/0428 |

FOREIGN PATENT DOCUMENTS

| | | |
|---|---|---|
| CN | 109636514 A | 4/2019 |
| CN | 110248203 A | 9/2019 |
| CN | 110996111 A | 4/2020 |
| CN | 111147881 A | 5/2020 |

OTHER PUBLICATIONS

Video entitled Yonghao Luo brought Xiaomi 10 and Xiaomi 10 pro, Weibing Lu sent 500,000 red envelopes, issue date Apr. 2, 2020, available at https://b23.tv/cFdTi5F.

\* cited by examiner

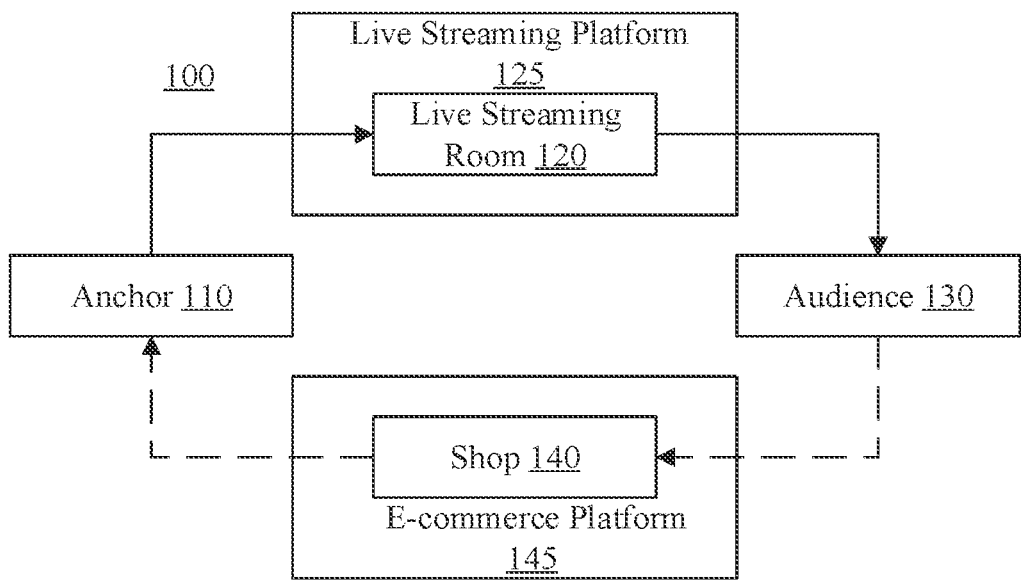

FIG.1

```
In response to receiving a first configuration request from a first
client, configuring allocable electronic resources for a live
streaming room, wherein the first configuration request is
configured to indicate a first configuration operation performed   — S201
by an anchor to the live streaming room, and the allocable
electronic resources are associated to a target commodity
corresponding to the live streaming room
```

```
Acquiring an allocation request sent by a second client,
wherein the allocation request is triggered by an              — S202
interactive operation of an audience of the second client
in the live streaming room
```

```
In response to the allocation request, allocating an           — S203
electronic resource from the allocable electronic
resources to the audience of the second client-side,
wherein the allocated electronic resource is used by the
audience for completing an order operation about the
target commodity
```

FIG.2

METHOD AND APPARATUS FOR ALLOCATING ELECTRONIC RESOURCE

CROSS REFERENCE

This application claims priority to Chinese Patent Application No. 202011005444.6, titled METHOD AND APPARATUS FOR ALLOCATING ELECTRONIC RESOURCE, filed on Sep. 22, 2020, the content of which is incorporated herein by reference in its entirety.

TECHNICAL FIELD

The present disclosure relates to computer applications, and in particular to methods, non-transitory processor readable media, and apparatuses for allocating electronic resources.

BACKGROUND

With the development of live streaming industry and E-commerce industry, an E-commerce live streaming that incorporates both E-commerce and live streaming is becoming more popular.

SUMMARY

According to some arrangements, a method for allocating electronic resources is applied to a server and includes in response to receiving a first configuration request from a first client, configuring allocable electronic resources for a live streaming room. The first configuration request is configured to indicate a first configuration operation performed by an anchor to the live streaming room, and the allocable electronic resources are associated to a target commodity corresponding to the live streaming room. The method further includes acquiring an allocation request sent by a second client, the allocation request being triggered by an interactive operation of an audience of the second client in the live streaming room. In response to the allocation request, allocating an electronic resource from the allocable electronic resources to the audience of the second client. The allocated electronic resource is used by the audience for completing an order operation about the target commodity.

According some arrangements, a first client for allocating electronic resources includes a processor and a memory, the processor configured to acquire a first configuration operation of an anchor for a live streaming room and send a first configuration request to a server based on the first configuration operation. The first configuration request is configured to enable the server to configure allocable electronic resources for the live streaming room. The allocable electronic resources are associated to a target commodity corresponding to the live streaming room.

According to some arrangements, a method for allocating electronic resources is applied to a second client and includes acquiring an interactive operation of an audience in a live streaming room and sending an allocation request to a server in response to the interactive operation. The allocation request is configured to enable the server to allocate an electronic resource from allocable electronic resources to the audience. The allocable electronic resources are configured by the server for the live streaming room in response to a first configuration request, the first configuration request is configured to indicate a first configuration operation performed by an anchor to the live streaming room. The allocable electronic resources are associated to a target commodity corresponding to the live streaming room. The allocated electronic resource is used by the audience for completing an order operation about the target commodity.

According to some arrangements, a device for allocating electronic resources is applied to a server and includes a processor and a memory for storing instructions executable by the processor. The processor is configured to execute instructions for implementing an electronic resource allocation method including in response to receiving a first configuration request from a first client, configuring allocable electronic resources for a live streaming room. The first configuration request is configured to indicate a first configuration operation performed by an anchor to the live streaming room, and the allocable electronic resources are associated to a target commodity corresponding to the live streaming room. The method further includes acquiring an allocation request sent by a second client, the allocation request being triggered by an interactive operation of an audience of the second client in the live streaming room. In response to the allocation request, allocating an electronic resource from the allocable electronic resources to the audience of the second client. The allocated electronic resource is used by the audience for completing an order operation about the target commodity.

According to some arrangements, a device for allocating electronic resources is applied to a first client and includes a processor and a memory for storing instructions executable by the processor. wherein the processor is configured to execute instructions for implementing an electronic resource allocation method including acquiring a first configuration operation of an anchor for a live streaming room and sending a first configuration request to a server based on the first configuration operation. The first configuration request is configured to enable the server to configure allocable electronic resources for the live streaming room. The allocable electronic resources are associated to a target commodity corresponding to the live streaming room.

According to some arrangements, a device for allocating electronic resources is applied to a second client and includes a processor and a memory for storing instructions executable by the processor. The processor is configured to execute instructions for implementing the electronic resource allocation method that includes acquiring an interactive operation of an audience in a live streaming room and sending an allocation request to a server in response to the interactive operation. The allocation request is configured to enable the server to allocate an electronic resource from allocable electronic resources to the audience. The allocable electronic resources are configured by the server for the live streaming room in response to a first configuration request, the first configuration request is configured to indicate a first configuration operation performed by an anchor to the live streaming room. The allocable electronic resources are associated to a target commodity corresponding to the live streaming room. The allocated electronic resource is used by the audience for completing an order operation about the target commodity.

According to some arrangements, a non-transitory computer-readable storage medium having instructions stored thereon, when the instructions are performed by a processor of an electric device, methods for allocating electronic resources according any arrangement disclosed herein.

BRIEF DESCRIPTION OF THE DRAWINGS

FIG. 1 is a schematic diagram of an interaction scenario of E-commerce live streaming shown in the present disclosure.

FIG. 2 is a flowchart of a method for allocating electronic resources according to arrangements of the present disclosure.

DETAILED DESCRIPTION

Figure 3:
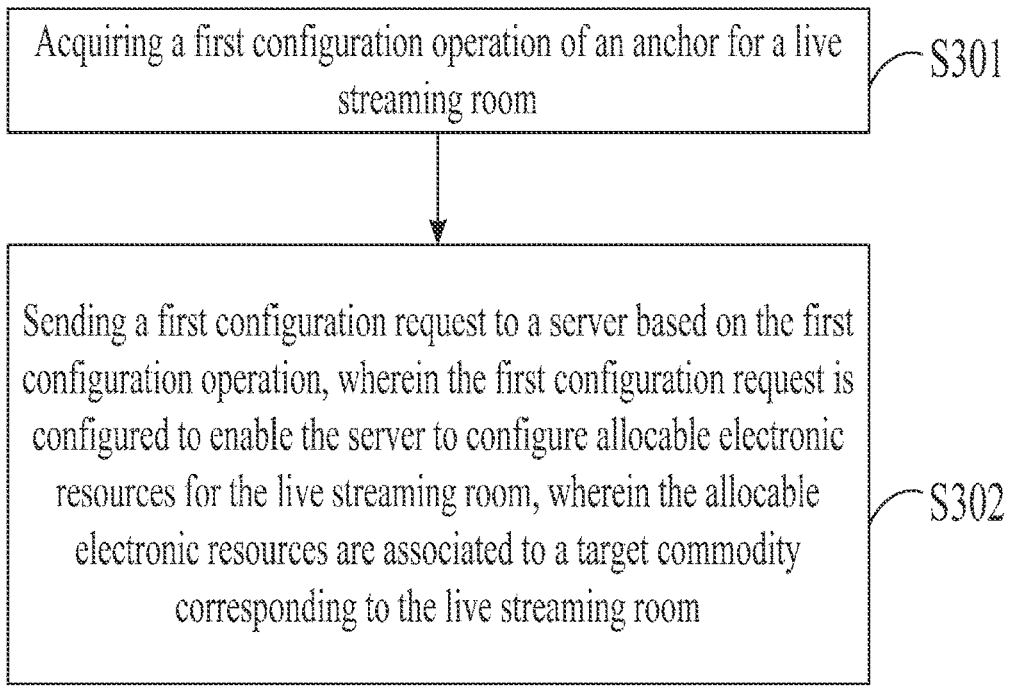
FIG. 3 is a flowchart of a method for allocating electronic resources according to arrangements of the present disclosure.

In order to enable those skilled in the art to better understand the technical solutions in one or more arrangements of the present disclosure, in the following, in conjunction with the drawings in one or more arrangements of the present disclosure, the technical solution is described clearly and completely. Obviously, the described arrangements are only a part of the arrangements, rather than all the arrangements. Based on one or more arrangements of the present disclosure, all other arrangements obtained by a person of ordinary skill in the art without creative work shall fall within the protection scope of the present disclosure.

When the following description refers to the drawings, unless otherwise indicated, same numbers in different drawings indicate the same or similar elements. The implementation manners described in the following arrangements do not represent all implementation manners consistent with the present disclosure. Rather, they are merely examples of systems and methods consistent with some aspects of the present disclosure as detailed in the appended claims.

The terms used in the present disclosure are only for the purpose of describing specific arrangements, and are not intended to limit the present disclosure. The singular forms of "a", "said" and "the" used in the present disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, third, etc. may be used in this disclosure to describe various information, the information should not be limited to these terms. These terms are only used to distinguish the same type of information from each other. For example, without departing from the scope of the present disclosure, the first information may also be referred to as second information, and similarly, the second information may also be referred to as first information. Depending on the context, the word "if" as used herein can be interpreted as "when" or "while" or "in response to determining".

With the development of the live streaming industry and the E-commerce industry, the E-commerce live streaming produced by the combination of both is becoming more popular. FIG. 1 shows a schematic diagram of an interaction scenario of E-commerce live streaming 100 in this disclosure.

In this example, four main roles are included, namely at least one anchor 110, at least one live streaming room 120, an audience 130, and at least one shop 140. The live streaming room 120 may be tied to or provided by a live streaming platform 125, and the shop 140 may be tied to or provided by an E-commerce platform 145. It is understood that the anchor 110 in the present disclosure may refer to an abstract role of the merchant through E-commerce live streaming channel, and is not limited to specific roles such as shop manager, anchor actor, backstage technologists, etc. The live streaming platform 125 and E-commerce platform 145 mentioned above can be two separate platforms, and can also be the same comprehensive platform that provides both live streaming and E-commerce services.

In this scenario, the interaction is mainly divided into two parts: live streaming and consumption. The solid arrow in FIG. 1 represents a push direction of the live streaming program during the live streaming process, and the dotted arrow represents a flow direction of funds during the consumption process. From this, we can see that the anchor 110 sells products through the live streaming, and the audience 130 can consume through the shops 140 in the E-commerce platform 145. After the resulted profit is returned to the anchor, it can be used as a publicity investment to further attract the audiences/customers to consume or watch the live streaming.

For example, the live streaming platform 125 can provide a red envelope (representing a certain amount of money or asserts, fiat or digital) grab function to attract audiences 130 to keep paying attention to the live streaming. For example, the anchor 110 (merchant) can set a certain amount of cash red envelopes, or a certain amount of platform token red envelopes, thus attracting audiences/customers to continue watching the live streaming to grab red envelopes, and enhancing the dissemination of the content of the live streaming.

However, although the above solution has improved attention of the audience 130/customers to the live streaming room, the audiences 130/customers have no further enthusiasm for the products related to the live streaming room. Therefore, the red envelope grab may not be cost-efficient, resulting in a waste of resources put into by the anchor 110/merchant, such as cash and platform tokens.

For example, the shop owner Mr. Zhang agreed with the audience 130 in the live streaming room 120 to give out a total of 1,666 RMB in cash red envelopes at 20:00 tonight, and the audience 130 who watch the live streaming in the live streaming room 120 will have the opportunity to grab it. In this case, tonight at 20:00, it is indeed possible to attract more audience 130 into the live streaming room 120 to watch the live streaming. Therefore, the spread of the live program content at this moment is relatively high, so higher revenue can be expected. However, for the audience 130, there is no further enthusiasm for the related products in the live streaming room 120 caused by these cash red envelopes, so it is likely that after grabbing the cash red envelopes, the audience 130 will leave the live streaming room 120 directly, or stay in the live streaming room 120 to only continue watching but not to buy, which leads to the benefits to the shop owner Mr. Zhang resulted by the investment 1,666 RMB being very limited, and even wasteful.

Based on this, the present disclosure proposes a technical solution that configures, in the live streaming room, electronic resources that can be used when completing orders for commodities corresponding to the live streaming room, and allocates the electronic resources to the audience participating in the interaction in the live streaming room.

The electronic resources that can be allocated are no longer cash or virtual universal currencies such as platform tokens, but are vouchers that can be used when completing orders for the target commodities that have a corresponding relationship with this live streaming room, and are configured in the live streaming room based on a configuration operation of the anchor.

In the above technical solutions, on the one hand, in order to obtain the electronic resources configured in the live streaming room, the audience in the live streaming room will actively participate in the interaction in the live streaming room, thus increasing the audience's participation in the live streaming.

On the other hand, given that the allocated electronic resources are set to be used by the audience for completing an order operation for the target commodity corresponding to the live streaming room, it is more targeted and helps to improve the utilization of electronic resources.

The technical solution will be described below through specific arrangements in combination with specific application scenarios.

FIG. 2 is a flowchart of a method for allocating electronic resources according to arrangements of the present disclosure. The method can be executed by a server of a live streaming platform and may include the followings.

In S201, allocable electronic resources are configured for a live streaming room (e.g., the live streaming room 120), in response to receiving a first configuration request from a first client. The first configuration request is configured to indicate a first configuration operation performed by an anchor (e.g., the anchor 110) to the live streaming room, and the allocable electronic resources are associated to a target commodity corresponding to the live streaming room.

In S202, an allocation request sent by a second client is acquired. The allocation request is triggered by an interactive operation of an audience (e.g., the audience 130) of the second client in the live streaming room.

In S203, an electronic resource is allocated to the audience of the second client from the allocable electronic resources, in response to the allocation request. The allocated electronic resource is used by the audience for completing an order operation about the target commodity.

The live streaming room can be any web live streaming room used to assist in the development of e-commerce business. For example, the live streaming room can be regarded as a logical space in the live streaming platform, and the anchor can use this logical space to push the live streaming programs to the audience, and interact with the audience by comments, grab red envelopes, etc. It is understood that, those skilled in the art can also make corresponding adjustments to the specific construction methods of the live streaming room according to specific needs. For example, the anchor does not push the live program stream to the live streaming platform first, but directly build a live streaming server to push the live streaming outward. That is to say, the anchor 110 and the live streaming platform 125 in FIG. 1 are combined into one, which is also a feasible way. The details about the specific construction method of the live streaming room are not limited in the disclosure.

The allocable electronic resources can be a collection of several pre-divided electronic resources, or electronic resources that has not been divided but the total value is determined. Taking the discount coupon red envelopes as an example, the allocable electronic resources can be 100 discount coupon red envelopes, each of them has RMB 5, and can also be a pool of red envelopes with a total value of RMB 500 and the division method for the pool of red envelopes has not yet been determined. Since electronic resources such as commodity vouchers have a targeted correspondence with the target product, they are not currency or general-purpose electronic resources such as platform tokens, so they will not be misappropriated for other purposes, thus reducing the waste of electronic resources invested.

The target commodity corresponding to the live streaming room may be any target commodity that has a corresponding relationship with the live streaming room used for e-commerce business. It may be either a physical commodity or a virtual commodity or service. The specific correspondence between the target commodity and the live streaming room may include the existence of a certain interest relationship, etc., which is not listed herein.

FIG. 3 is a flowchart of a method for allocating electronic resources according to arrangements of the present disclosure. This method can be executed by a first client of the anchor, and may include the followings.

In S301, a first configuration operation of an anchor for a live streaming room is acquired.

In S302, a first configuration request is sent to a server, based on the first configuration operation. The first configuration request is configured to enable the server to configure allocable electronic resources for the live streaming room. The allocable electronic resources are associated to a target commodity corresponding to the live streaming room.

Figure 4:
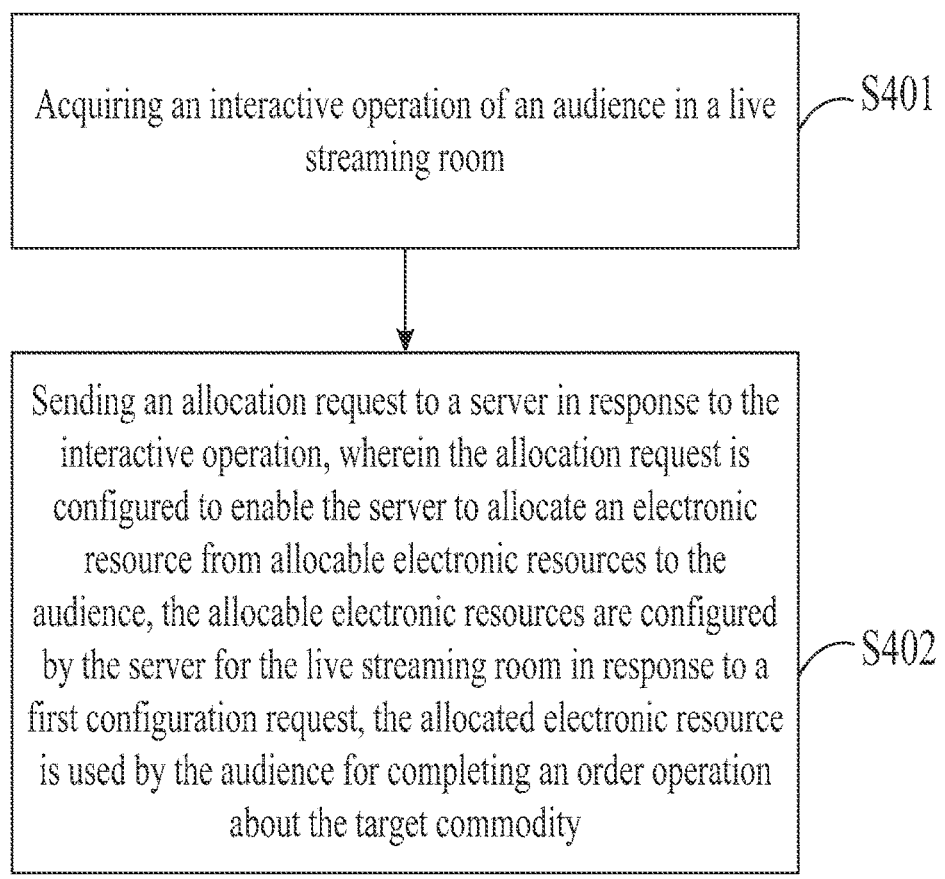
FIG. 4 is a flowchart of a method for allocating electronic resources according to arrangements of the present disclosure.

FIG. 4 is a flowchart of a method for allocating electronic resources according to arrangements of the present disclosure. This method can be executed by a second client of an audience, and may include the followings.

In S401, an interactive operation of an audience in a live streaming room is acquired.

In S402, an allocation request is sent to a server, in response to the interactive operation. The allocation request is configured to enable the server to allocate an electronic resource from allocable electronic resources to the audience, the allocable electronic resources are configured by the server for the live streaming room in response to a first configuration request, the first configuration request is configured to indicate a first configuration operation performed by an anchor to the live streaming room, the allocable electronic resources are associated to a target commodity corresponding to the live streaming room, and the allocated electronic resource is used by the audience for completing an order operation about the target commodity.

In some arrangements, the target commodity corresponding to the live streaming room may be the commodity recommended by a program in the live streaming room, or the commodity in one or more shops corresponding to the live streaming room, or both. It is understood that since the allocable electronic resources are used to deduct the amount of consumption of the target commodity corresponding to the live streaming room when the audience in the live streaming room completes the order operation about the target commodity, the specific meaning of the electronic resource is different due to the different target commodity.

For example, if an AA brand facial cleanser in Mr. Zhang's shop is being recommended in the live streaming room, then the AA brand facial cleanser can be regarded as a commodity recommended by the program in the live streaming room, that is, the target commodity corresponding to the live streaming room. In this case, the electronic resource used to deduct the target commodity may be a coupon that can be used when purchasing the AA brand facial cleanser in Mr. Zhang's shop.

For another example, the live streaming room is operated by MR. Zhang, so the target commodity can also be all the commodities in the e-commerce shop operated by Mr. Zhang. In this case, the electronic resource used to deduct the target commodity may be a universal coupon that can be used when purchasing any commodity in Mr. Zhang's shop.

For another example, Mr. Zhang reached an agreement with Mr. Li and Mr. Wang that the e-commerce shops operated by Mr. Li and Mr. Wang can also be promoted by this live streaming room. That is to say, both of Mr. Li's e-commerce shop and Mr. Wang's e-commerce shop can be regarded as a shop corresponding to the live streaming room, and the target product can also be all the commodities in the shops of Mr. Zhang, Mr. Li, and Mr. Wang. In this case, the electronic resource used to deduct the target commodity can be a universal coupon that can be used when purchasing any commodity in Mr. Zhang's shop, Mr. Li's shop, and Mr. Wang's shop.

Therefore, the above-mentioned corresponding relationship can be flexibly set according to specific conditions, such as book category discount coupons, fresh product category discount coupons, which is not limited in this disclosure. The above solution ensures the corresponding relationship between electronic resources, live streaming rooms, and target commodities, which can form a closed business loop from the audience's participating in live streaming to e-commerce consumption, and improve the fluency of audience participation in business.

In this example, the server of the aforementioned live streaming platform may, in response to receiving the first configuration request sent by a first client, configure allocable electronic resources for the live streaming room. The first configuration request is configured to indicate a first configuration operation performed by an anchor to the live streaming room. For example, the server of the live streaming platform can identify the specific configuration request of the anchor, and then configure the allocable electronic resources for the live streaming room according to the needs of the anchor. The specific implementation of the interaction process may depend on specific needs, which is not limited in arrangements of the disclosure.

In some arrangements, an interface of the first client of the anchor may include a configuration option for the live streaming room, and the first client can obtain the first configuration operation performed by the anchor through the configuration option for the live streaming room, and send the corresponding electronic resource configuration request to the server of the live streaming platform. In response to the electronic resource configuration request, the server configures allocable electronic resources for the live streaming room, according to the anchor's first configuration operation on the live streaming room indicated by the electronic resource configuration request.

With the above solution, the configuration of the allocable electronic resources to be configured in the live streaming room can be completed more flexibly by using the configuration option in the interface of the first client.

In some arrangements, the allocable electronic resources may also include limited-time effective coupon corresponding to the target commodity. The limited-time effective coupon can encourage the audience to use the coupon as soon as possible to a certain extent, so as to obtain better returns. It is understood that, the validity period of the limited-time effective coupon may be a preset fixed value, or may be configured by the anchor through the first configuration operation.

Figure 5:
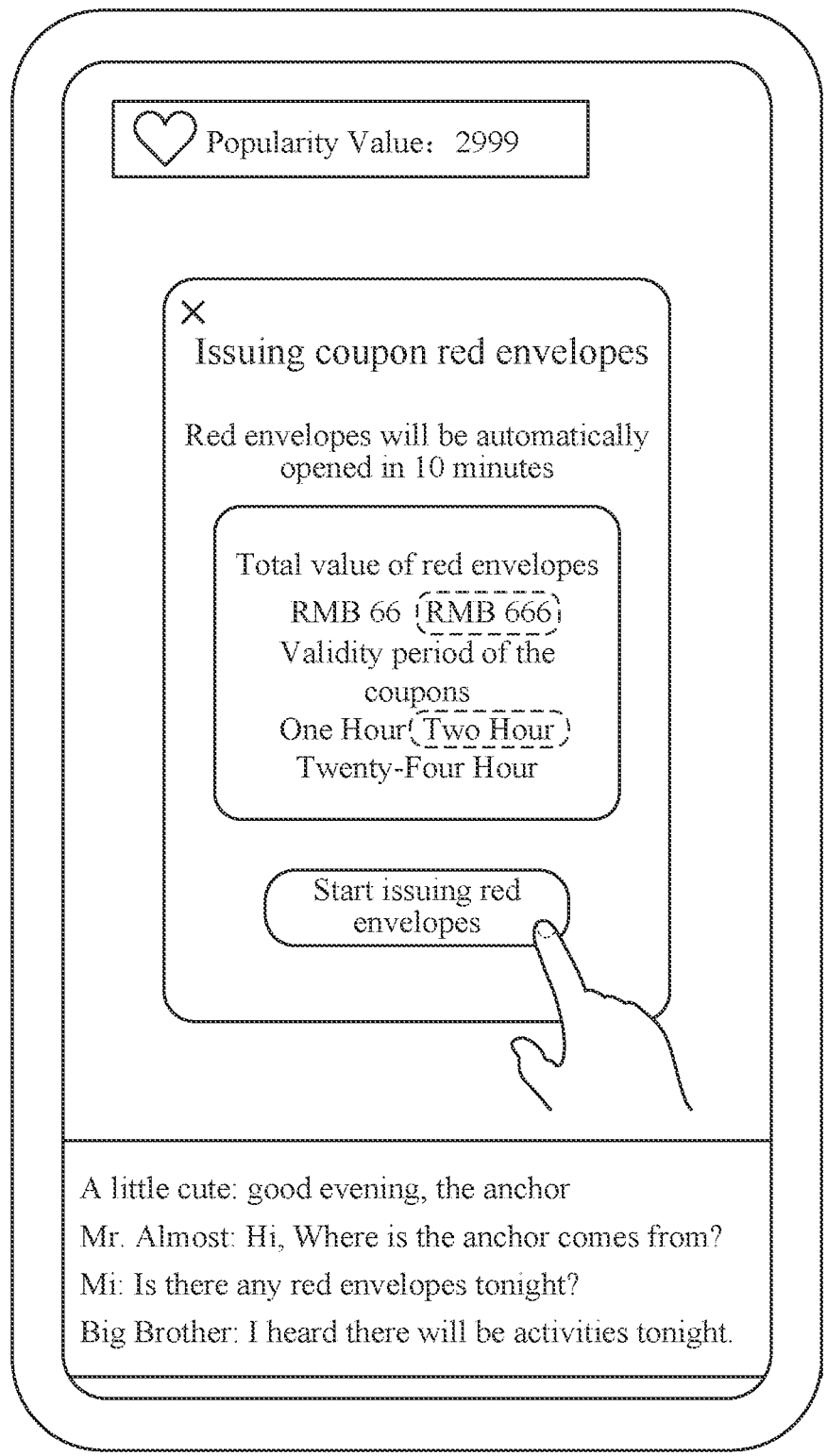
FIG. 5 is a schematic diagram showing an interface of the first client according to arrangements of the present disclosure.

FIG. 5 shows a schematic diagram showing an interface of the first client according to arrangements of the present disclosure. In this example, the first client of the anchor is a smartphone App, and the interface includes a configuration option of "Issuing coupon red envelope". In this example, the anchor can choose the total value of the coupon red envelope to be RMB 666, and choose that the coupon red envelope is valid only for 2 hours. After triggering the "start issuing red envelopes" button, the first client of the anchor sends the anchor's configuration operations on the live streaming room, such as the total value of the coupon red envelope and the valid time of the coupon, to the server through the electronic resource configuration request, so that the server can complete the configuration process of said electronic resources.

In an arrangement, after configuring the allocable electronic resources for the live streaming room, the server may further send allocation information corresponding to the allocable electronic resources to the second client corresponding to the audience in the live streaming room. After acquiring the allocation information, the second client corresponding to the audience in the live streaming room outputs an interactive control in the live streaming interface of the live streaming room. The interactive control is configured to request an allocation of the electronic resources. With this solution, the audience's second client can be directly provided with an operation entrance for receiving electronic resources, thus further increasing the number of audiences staying in the live streaming room.

It is understood that the interactive control can be provided as a dynamic icon, a pop-up notification or the like on the live streaming interface, which is not limited in arrangements of the disclosure.

In addition, the interactive control corresponding to the allocable electronic resources can also be presented by the second client of the audience in other live streaming rooms. For example, the second client of the audience in other live streaming rooms may present a floating button such as "Room 12345 is issuing red envelope coupons of ten thousand", etc., which can further expand the spread of information such as "a certain live streaming room has a certain deduction coupon being issued", thus attracting more audiences to enter this live streaming room, and become potential consumers of the target commodity corresponding to this live streaming room.

In an arrangement, the allocation request acquired by the server may be sent by the second client in response to the interactive operation of the audience for the interactive control outputted in the live streaming interface of the live streaming room.

By adopting the above solution, it is possible to flexibly receive the allocation request for requesting the allocation of the above electronic resources through the customization of the interactive control.

In actual design, in order to enable the server to acquire the allocation request triggered by the audience for requesting the allocation of the above electronic resources, the second client may first output a prompt control, and then further display the interactive control for requesting the allocation of the above electronic resources in response to the audience's triggering operation on the prompt control.

For example, a banner notification such as "The anchor is issuing a red envelope of RMB 10,000 discount coupons" is displayed on the live streaming interface. After the audience clicks on the banner notification, a pop-up window "opening the red envelope" is pop up, where the pop-up window is corresponding to the interactive control for requesting the allocation of the above electronic resources.

Figure 6:
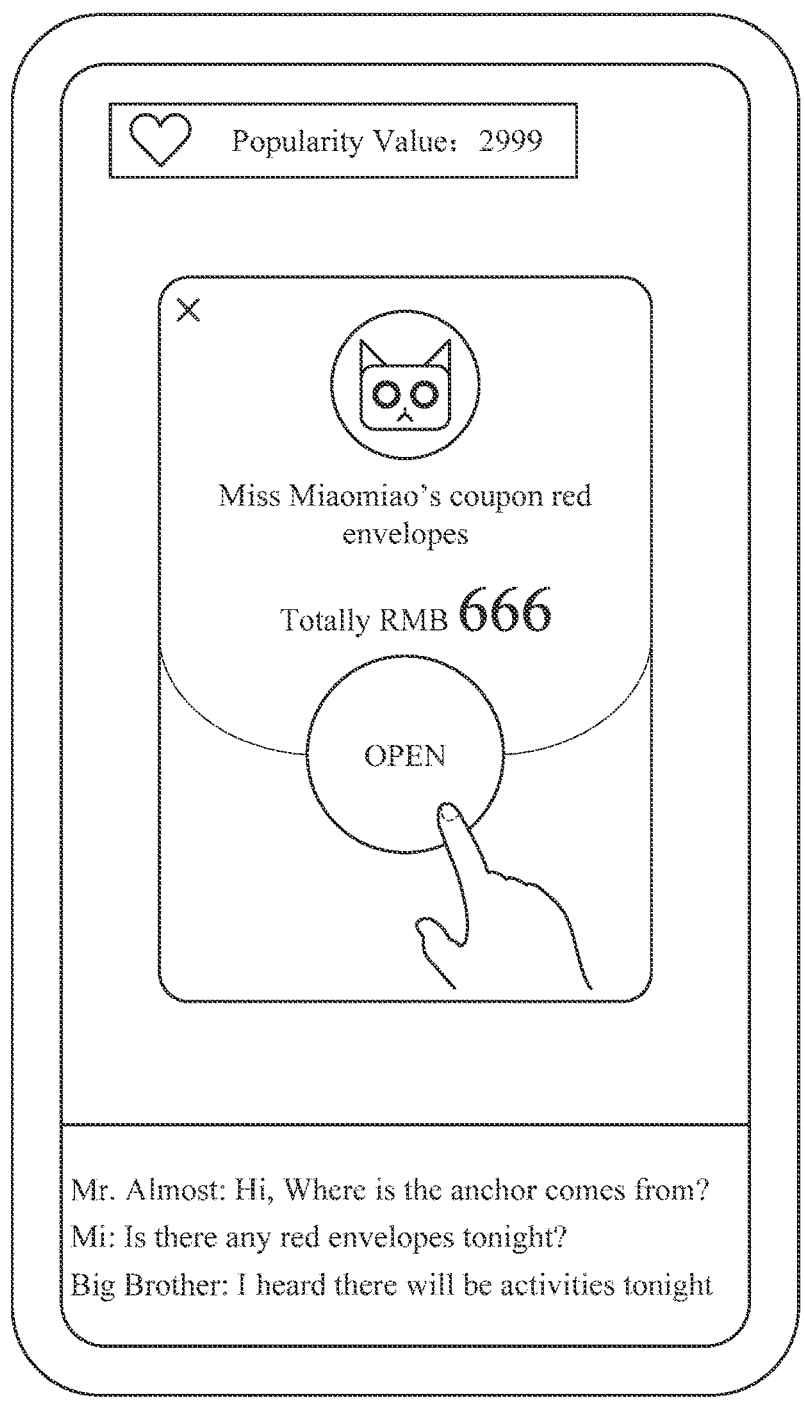
FIG. 6 is a schematic diagram showing an interface of the second client according to arrangements of the present disclosure.

FIG. 6 is a schematic diagram of an interface of the second client according to arrangements of the present disclosure. In this example, the anchor Miss Miaomiao had pre-issued totally coupon red envelopes of RMB 666. After receiving the above allocation information, the audience's second client can output a page of "Miss Miaomiao's coupon red envelopes" on the live streaming interface of the audience's second client, as shown in FIG. 6. The audience can click the "Open" button on the "Miss Miaomiao's coupon red envelopes" page. The audience's second client then sends, to the server, the allocation request for requesting the allocation of the above electronic resources.

It is understood that, in order to make the red envelopes play a better role in convening the audiences, usually there can be a certain time difference between the start of issuing the red envelopes and the opening of the red envelopes. For example, as shown in FIG. 3, the anchor has set "Red envelopes will be automatically open in 10 minutes", and then the audiences who enter the live streaming room within 10 minutes may stay in the live streaming room in order to open the red envelopes. Therefore, the adoption of this scheme can increase the number of audiences, thus improving the effect of promotion and recommendation.

In some arrangements, the server may further, in response to a second configuration request sent by the first client, which is used to indicate a second configuration operation performed by an anchor to the live streaming room, adjust the total value of allocable electronic resources that had already allocated for the live streaming room. For example, after the anchor configures vouchers of RMB 666 in total as allocable electronic resources for the live streaming room, he finds that the activity is not strong enough, and needs to readjust the aforementioned vouchers of RMB 666 into vouchers of RMB 1666, the above second configuration operation to the live streaming room can be sent to the server through the second configuration request, so as to complete the above task. With this design, the anchor can flexibly adjust the electronic resource allocation activities.

Similar to the first configuration operation for configuring allocable electronic resources, the specific implementation of the second configuration operation for adjusting the total value of the configured allocable electronic resources can also be selected according to specific needs, which is not limited in arrangements of the disclosure.

In arrangements, after adjusting the total value of the allocable electronic resources that have been configured for the live streaming room, the server may further send adjustment information corresponding to the adjusted total value of electronic resources to the second client corresponding to the audience in the live streaming room. Correspondingly, after receiving the adjustment information, the second client can output prompt information corresponding to the adjustment information in the live streaming interface of the live streaming room. For example, the anchor originally used vouchers of RMB 666 as allocable electronic resources, and later re-adjusted the vouchers of RBM 666 to vouchers of RMB 1666. Then, after receiving the adjustment information corresponding to the adjustment, the client outputs the prompt information, such as "Anchor has added another RMB 1000 in the red envelope!" in the live streaming interface.

Using the above solution, on the basis of supporting the flexible adjustment of the total value of electronic resources, audiences can know more clearly the information that the total value of electronic resources has been adjusted, and can further explore those who are not participating in the allocation of the above electronic resources even though they are in the live streaming room.

In addition, the adjustment information can also be sent across different live streaming rooms. For example, sending the prompt information "Anchor has added another RMB 1000 in the red envelope!" to other live streaming rooms, that is, the anchor can get more audience traffic from other live streaming rooms, thus enhancing the exposure rate of the present live streaming room.

In this example, there are many ways to allocate the electronic resources to the audience. For example, the more common equalitarian allocation mode can be understood as dividing the electronic resources into several parts in advance, and then allocating the divided electronic resources parts to several audiences respectively. Furthermore, the combination mode of "competition on hand speed" and "competition on good luck" usually relies on random number generators, so that the mathematical expectation of the amount of electronic resource received by each audience is the same, but there has certain fluctuations. The allocation mode may depend on specific needs, which is not limited in the disclosure.

In some arrangements, before allocating electronic resources to the audience, the server may obtain a feature score of the audience first, and then allocate the electronic resources based on the feature score. The feature score can indicate a core of an expected return that the audience can generate for the live streaming room. According to the feature score and the total value of the electronic resource, it is possible to determine the expected allocated electronic resource of the audience.

It is understood that the expected allocation value can be positively correlated with the feature score, that is, the higher the expected return that the audience brings to the live streaming room, the higher expected allocated value of the electronic resource to the audience. By using this solution, audiences who are expected to bring greater benefits or earnings to the live streaming room can receive higher-value electronic resources, thus avoiding the allocation of high-value electronic resources to "passerby" audiences who generate low benefits or earnings for the live streaming room, and improving the efficiency of resource allocation.

After the expected allocation value is determined, the server can successively allocate the electronic resources to respective audiences according to the expected allocation amount in combination with the order of timestamps of the allocation requests sent by the audiences. The allocation process can be performed until all the electronic resources are allocated.

In some arrangements, the feature score of the audience in the live streaming room may include an evaluation score obtained by analyzing the historical behavior data of the audience. For example, the audience's historical behavior data may include the audience's live streaming participation records and/or commodity consumption records. This is because the revenue generated from the live streaming room used for the e-commerce business may mainly include two kinds of channels, namely live streaming channels and e-commerce channels. That is, whether you watch programs in the live streaming room, participate in interaction, or consume in the corresponding e-commerce shop in the live streaming room, you can generate revenue for the live streaming room.

For example, the audience E's consumption for the commodity in the live streaming room is not high, but the live streaming participation is high. The audience F's live streaming participation is very low, but the consumption and shopping through e-commerce channels are very frequent. The audience G is not interested in either live streaming participation or e-commerce shopping. In other words, it is difficult for audience G to generate significant benefits or revenues in the live streaming room. Therefore, the feature score calculated for audience E and audience F may be significantly higher than that of audience G Further, audience E and audience F are expected to be allocated significantly higher value of electronic resources than audience G.

The above content is arrangements of the method for allocating electronic resources of the present disclosure. Based on the above content, the method executed by each participant, i.e., the server, the first client, and the second client is clear, which will not be elaborated here.

Figure 7:
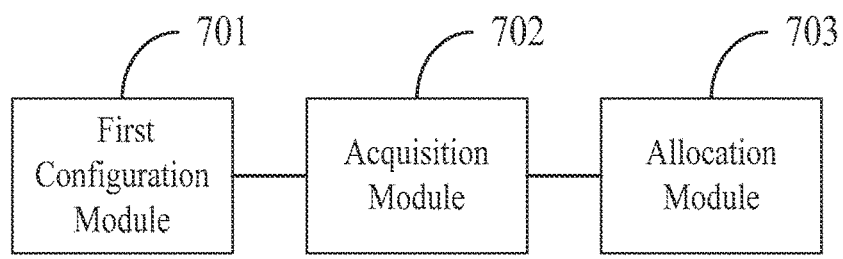
FIG. 7 is a schematic block diagram showing an apparatus for allocating electronic resources according to arrangements of the present disclosure.

The present disclosure also provides the following arrangements of corresponding apparatuses for allocating an electronic resource:

FIG. 7 is a schematic block diagram showing an apparatus for allocating electronic resources according to arrangements of the present disclosure. The apparatus may be applied to the server and may include a first configuration module 701, an acquisition module 702, and an allocation module 703.

The first configuration module 701 is configured to configure allocable electronic resources for a live streaming room, in response to receiving a first configuration request from a first client. The first configuration request is configured to indicate a first configuration operation performed by an anchor to the live streaming room, and the allocable electronic resources are associated to a target commodity corresponding to the live streaming room.

The acquisition module 702 is configured to acquire an allocation request sent by a second client. The allocation request is triggered by an interactive operation of an audience of the second client in the live streaming room.

The allocation module 703 is configured to allocate an electronic resource from the allocable electronic resources to the audience of the second client, in response to the allocation request. The allocated electronic resource is used by the audience for completing an order operation about the target commodity.

In some arrangements, the above-mentioned target commodity corresponding to the live streaming room may be the commodity recommended by a program in the live streaming room, or the commodity in one or more shops corresponding to the live streaming room, or both. It is understood that since the allocable electronic resources are used to deduct the amount of consumption of the target commodity corresponding to the live streaming room when the audiences in the live streaming room completing the order operation about the target commodity, thus the specific meaning of the corresponding electronic resource is different due to the different target commodity.

Using the above solution to ensure the corresponding relationship between electronic resources, live streaming rooms, and target commodities can ensure that audiences form a closed business loop from participating in live streaming to e-commerce consumption, and improve the fluency of audience participation in business.

In this example, the first configuration module 701 may, in response to receiving a first configuration request from a first client, configure allocable electronic resources for a live streaming room. The first configuration request is used to indicate a first configuration operation performed by an anchor to the live streaming room. Specifically, the first configuration module 701 can identify the specific configuration request of the anchor, and then configure the allocable electronic resources for the live streaming room according to the needs of the anchor.

In some arrangements, the sever may include a configuration option for the live streaming room, and the client can obtain the first configuration operation performed by the anchor through the above-mentioned configuration option for the live streaming room, and send the corresponding electronic resource configuration request to the server of the live streaming platform. The first configuration module 701 may, in response to the electronic resource configuration request, configure allocable electronic resources for the said live streaming room, according to the anchor's first configuration operation on the said live streaming room indicated by the electronic resource configuration request.

With the above solution, the configuration of the allocable electronic resources to be configured in the live streaming room can be completed more flexibly by using the configuration option of the first client interface of the anchor.

In some arrangements, the above-mentioned allocable electronic resources may also be a limited time effective coupon corresponding to the target commodity. It is understood that, the validity period of the limited-time effective coupon may be a preset fixed value, or the above-mentioned anchor may instruct the first configuration operation of the above-mentioned live streaming room to complete a custom configuration. The design of a limited time effective coupon can encourage the audience to use the coupon as soon as possible to a certain extent, so as to obtain better returns.

In some arrangements, the apparatus mentioned above further includes a first sending module configured to send allocation information corresponding to the allocable electronic resources to the second client. The second client is configured to, in response to receiving the allocation information, output an interactive control in a live streaming interface of the live streaming room, and wherein the interactive control is configured to request allocation of the allocable electronic resources. With this solution, the audience's second client can be directly provided with an operation entrance for receiving electronic resources, thus further increasing the number of audiences staying in the live streaming room.

In some arrangements, the acquisition module 702 may acquire the allocation request, in response to an interactive operation of the audience on the interactive control. By adopting the above solution, it is possible to flexibly realize the reception of the allocation request for requesting the allocation of the above electronic resources through the customization of the above interactive controls.

In some arrangements, the apparatus mentioned above further includes an adjustment module configured to in response to receiving a second configuration request from the first client, adjust a total value of the allocable electronic resources that have been configured for the live streaming room. The second configuration request is configured to indicate a second configuration operation performed by the anchor to the live streaming room.

In some arrangements, the apparatus mentioned above further includes a second sending module configured to send adjustment information to the second client. The adjustment information is configured to indicate adjustment of the total value of the allocable electronic resources. Using the above solution, on the basis of supporting the flexible adjustment of the total value of electronic resources, it also allows audiences to know more clearly the information that the total value of electronic resources has been adjusted, and can further explore those who are not participating in the allocation of the above electronic resources even though they are in the live streaming room.

In some arrangements, the apparatus mentioned above further includes a computation module configured to acquire a feature score of the audience. The feature score is configured to indicate an expected return generated by the audience. Accordingly, the allocation module 703 is further configured to determine an expected allocation value of the electronic resource for the audience based on the feature score and a total value of the allocable electronic resources. The expected allocation value is positively correlated with the feature score.

It is understood that the above-mentioned expected allocation value can be positively correlated with the above-mentioned feature score, that is, the higher the expected earnings that the audience brings to the live streaming room, the higher expected allocated value of the electronic resource to the audience. By using this solution, it is ensured that audiences who are expected to bring greater benefits or earnings to the live streaming room can receive higher-value electronic resources, thus avoiding the allocation of high-value electronic resources to "passerby" audiences who generate low benefits or earnings for the live streaming room, and improving the efficiency of resource allocation.

After the expected allocation value is determined, the allocation module 703 is configured to successively allocate the electronic resources to respective audiences according to the expected allocation amount in combination with the order of timestamps of the allocation requests sent by the audiences. The allocation process can be performed until all the electronic resources are allocated.

In some arrangements, the feature score of the audience in the live streaming room may include an evaluation score obtained by analyzing the historical behavior data of the audience. For example, the audience's historical behavior data may include the audience's live streaming participation records and/or commodity consumption records. This is because the revenue generated from the live streaming room used for the e-commerce business may mainly include two kinds of channels, namely live streaming channels and e-commerce channels. That is, whether you watch programs in the live streaming room, participate in interaction, or consume in the corresponding e-commerce shop in the live streaming room, you can generate revenue for the live streaming room.

Figure 8:
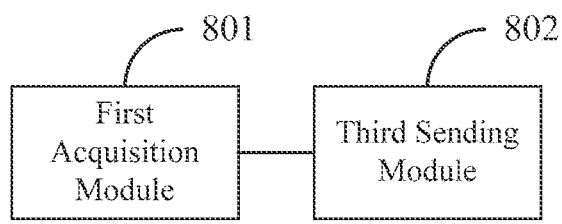
FIG. 8 is a schematic block diagram showing an apparatus for allocating electronic resources according to arrangements of the present disclosure.

Corresponding to the above electronic resource allocation apparatus applied to the server, the present disclosure also provides an apparatus for allocating electronic resources applied to the first client. FIG. 8 is a schematic block diagram showing an apparatus for allocating electronic resources according to arrangements of the present disclosure. The apparatus for allocating electronic resources may include a first acquisition module 801 and a third sending module 802.

The first acquisition module 801 configured to acquire a first configuration operation of an anchor for a live streaming room;

The third sending module 802 is configured to send a first configuration request to a server based on the first configuration operation. The first configuration request is configured to enable the server to configure allocable electronic resources for the live streaming room. The allocable electronic resources are associated to a target commodity corresponding to the live streaming room.

In some arrangements, the apparatus is further includes a second acquisition module configured to acquire a second configuration operation performed by the anchor to the live streaming room; and a fourth sending module configured to send a second configuration request to the server based on the second configuration operation. The second configuration request is configured to enable the server to adjust a total value of the allocable electronic resources that have been configured for the live streaming room. With this solution, the anchor can more flexibly configure electronic resources for the live streaming room.

Figure 9:
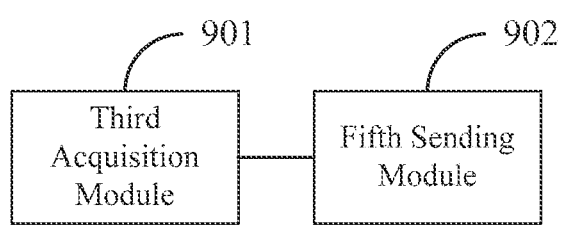
FIG. 9 is a schematic block diagram showing an apparatus for allocating electronic resources according to arrangements of the present disclosure.

Corresponding to the apparatus for allocating electronic resources applied to the server above, the present disclosure also provides an apparatus for allocating electronic resources applied to the second client. FIG. 9 is a schematic block diagram showing an apparatus for allocating electronic resources according to arrangements of the present disclosure. The apparatus for allocating electronic resources may include a third acquisition module 901 and a fifth sending module 902.

The third acquisition module 901 is configured to acquire an interactive operation of an audience in a live streaming room.

The fifth sending module 902 is configured to send an allocation request to a server in response to the interactive operation. The allocation request is configured to enable the server to allocate an electronic resource from allocable electronic resources to the audience, the allocable electronic resources are configured by the server for the live streaming room in response to a first configuration request, the first configuration request is configured to indicate a first configuration operation performed by an anchor to the live streaming room, the allocable electronic resources are associated to a target commodity corresponding to the live streaming room, and the allocated electronic resource is used by the audience for completing an order operation about the target commodity.

In some arrangements, third acquisition module 901 configured to acquire the interaction operation of the audience on an interactive control in a live streaming interface of the live streaming room. The interactive control is outputted by the second client in response to receiving allocation information corresponding to the allocable electronic resources from the server, the interactive control is configured to request an allocation of the allocable electronic resources. The allocation information is sent by the server after configuring the allocable electronic resources for the live streaming room. By adopting this solution, the audience can be further prompted to participate in the above-mentioned electronic resource allocation interactive activities.

In some arrangements, the apparatus is further includes a first outputting module configured to output prompt information in the live streaming interface of the live streaming room, in response to receiving adjustment information from the server. The adjustment information is sent by the server after adjusting a total value of the allocable electronic resources that have been configured for the live streaming room, and the prompt information is configured to indicate an adjustment of the total value of the allocable electronic resources. By adopting this solution, the audience can be further remaindered that the total value of the above electronic resources has been adjusted.

Based on the foregoing description, those skilled in the art can complete the specific design of the apparatus for allocating electronic resources applied to each participant of the first client and the second client based on the design solution applied to the above-mentioned server, and this disclosure does not require further details.

Regarding the apparatus in the foregoing arrangement, the specific implementation manner of each module therein has been described in detail in the arrangement describing the corresponding method, and detailed description will not be given herein.

The arrangement of the present disclosure also proposes a server. The server may include a processor and a memory for storing instructions executable by the processor. The processor is configured to execute instructions for implementing the method for allocating electronic resources applied to the server according to any arrangement mentioned above.

The arrangement of the present disclosure also proposes a client. The client may include a processor and a memory for storing instructions executable by the processor. The processor is configured to execute instructions for implementing the method for allocating electronic resources applied to the first client according to any arrangement mentioned above.

The arrangement of the present disclosure also proposes a client. The client may include a processor and a memory for storing instructions executable by the processor. The processor is configured to execute instructions for implementing method for allocating electronic resources applied to the second client according to any arrangement mentioned above.

The arrangement of the present disclosure also proposes a non-transitory computer-readable storage medium having instructions stored thereon, when the instructions are performed by a processor of an electric device, the method for allocating electronic resources according to any arrangement mentioned above is implemented by the electric device.

Figure 10:
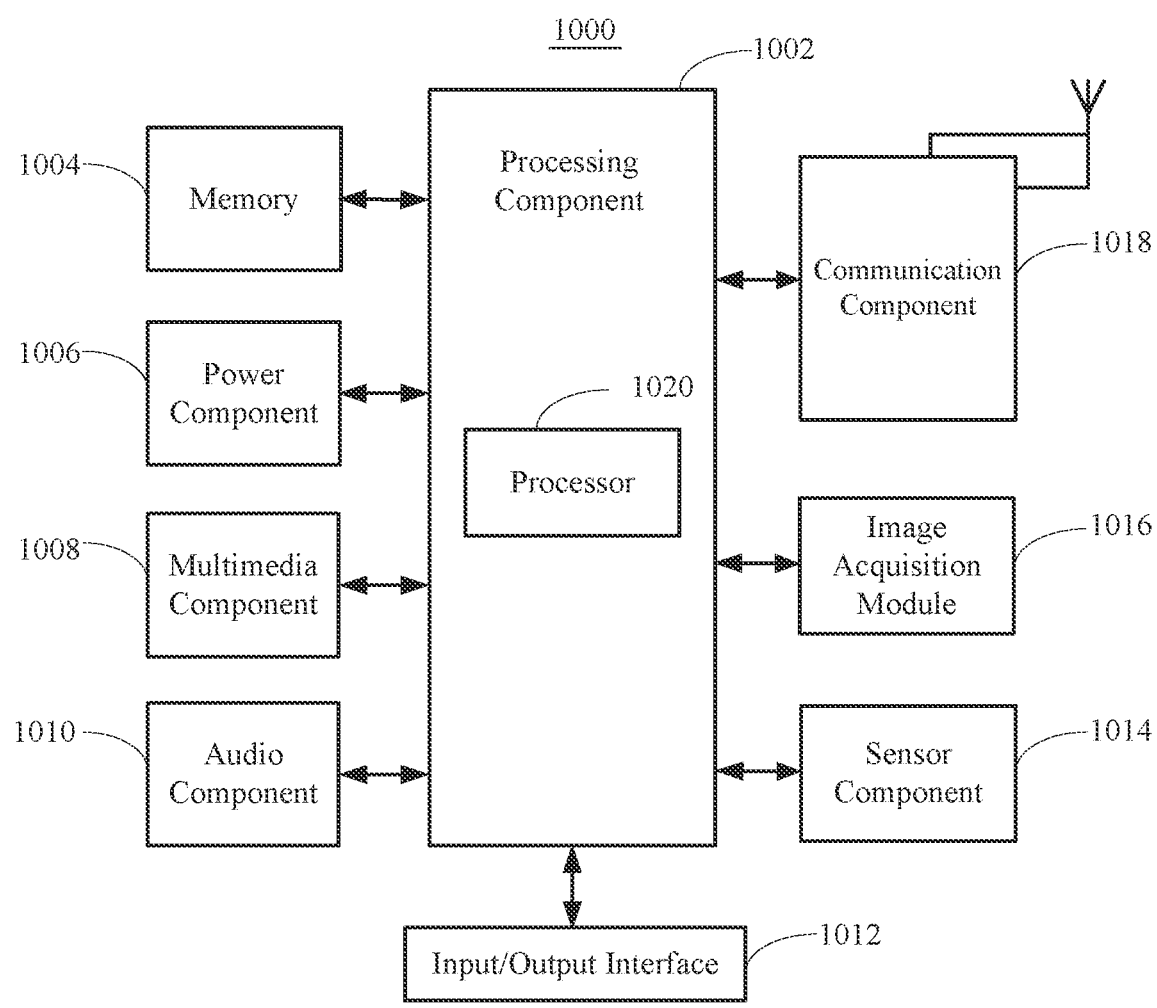
FIG. 10 is a structural diagram of an electronic device according to arrangements of the present disclosure.

FIG. 10 is a schematic block diagram showing an electronic device according to some arrangements of the present disclosure. It is understood that the above-mentioned server, first client, and second client can all adopt the structure of the electronic device. Referring to FIG. 10, the electronic device 1000 may include one or more of the following components: a processing component 1002, a memory 1004, a power component 1006, a multimedia component 1008, an audio component 1010, an input/output (I/O) interface 1012, a sensor component 1014, an image acquisition module 1016 and a communication component 1018.

The processing component 1002 typically controls the overall operations of the electronic device 1000, such as the operations associated with display, telephone calls, data communications, camera operations, and recording operations. The processing component 1002 can include one or more processors 1020 to execute instructions, so as to complete all or part of the steps of the above-mentioned method for generating a multimedia material. In addition, the processing component 1002 can include one or more modules to facilitate the interaction between the processing component 1002 and other components. For example, the processing component 1002 can include a multimedia module to facilitate the interaction between the multimedia component 1008 and the processing component 1002.

The memory 1004 is configured to store various types of data to support the operation of the device 1000. Examples of such data include instructions for any application or method operated on the device 1000, such as the contact data, the phone book data, messages, pictures, videos, and the like. The memory 1004 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 1006 provides power to various components of the electronic device 1000. The power component 1006 can include a power management system, one or more power sources, and other components associated with the generation, management, and distribution of power in the electronic device 1000.

The multimedia component 1008 includes a screen providing an output interface between the electronic device 1000 and the user. In some arrangements, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some arrangements, the multimedia component 1008 includes a front camera and/or a rear camera. When the electronic device 1000 is in an operation mode, such as a photographing mode or a video mode, the front camera and/or the rear camera can receive external multimedia data. Each of the front camera and the rear camera may be a fixed optical lens system or have focus and optical zoom capability.

The audio component 1010 is configured to output and/or input an audio signal. For example, the audio component 1010 includes a microphone (MIC) configured to receive an external audio signal when the electronic device 1000 is in an operation mode, such as a call mode, a recording mode, and a voice recognition mode. The received audio signal may be further stored in the memory 1004 or sent via the communication component 1018. In some arrangements, the audio component 1010 also includes a speaker for outputting the audio signal.

The I/O interface 1012 provides an interface between the processing component 1002 and peripheral interface modules, such as a keyboard, a click wheel, buttons, and the like. These buttons may include, but are not limited to, a home button, a volume button, a starting button, and a locking button.

The sensor component 1014 includes one or more sensors for providing status assessments of various aspects of the electronic device 1000. For example, the sensor component 1014 can detect an open/closed status of the electronic device 1000, relative positioning of components, such as the display and the keypad of the electronic device 1000. The sensor component 1014 can also detect a change in position of one component of the device 1000 or the device 1000, the presence or absence of user contact with the electronic device 1000, an orientation, or an acceleration/deceleration of the electronic device 100, and a change in temperature of the electronic device 1000. The sensor component 1014 can include a proximity sensor configured to detect the presence of nearby objects without any physical contact. The sensor component 1014 can also include a light sensor, such as a CMOS or CCD image sensor, configured to use in imaging applications. In some arrangements, the sensor component 1514 can also include an accelerometer sensor, a gyroscope sensor, a magnetic sensor, a pressure sensor, or a temperature sensor.

The communication component 1018 is configured to facilitate wired or wireless communication between the electronic device 1000 and other devices. The electronic device 1000 can access a wireless network based on a communication standard, such as WiFi, an operator network (such as 2G, 3G, 4G or 5G), or a combination thereof. In an arrangement, the communication component 1018 receives broadcast signals or broadcast associated information from an external broadcast management system via a broadcast channel. In an arrangement, the communication component 1018 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In an arrangement, the electronic device 1000 may be implemented with one or more application specific integrated circuits (ASICs), digital signal processors (DSPs), digital signal processing devices (DSPDs), programmable logic devices (PLDs), field programmable Gate array (FPGA), controllers, microcontrollers, microprocessors or other electronic components to perform the above method.

In an arrangement, there is also provided a non-transitory computer-readable storage medium including instructions, such as a memory 1004 including instructions executable by the processor 1020 of the electronic device 1000 to perform the above described method. For example, the non-transitory computer readable storage medium may be a read only memory (ROM), a random access memory (RAM), a CD-ROM, a magnetic tape, a floppy disc, and an optical data storage device.

In the above technical solutions, on the one hand, in order to allocate the electronic resources configured in the live streaming room, the audiences in the live streaming room will actively participate in the interaction in the live streaming room, thus increasing the audience's participation in the live streaming.

On the other hand, since the allocated electronic resources are set to be used by the audience when completing an order operation for the target product corresponding to the live streaming room, it is more targeted and helps to improve the utilization of electronic resources.

Those skilled in the art will easily think of other arrangements of the disclosure after considering the specification and practicing the arrangements disclosed herein. This disclosure is intended to cover any variations, uses, or adaptive changes of the disclosure. These variations, uses, or adaptive changes follow the general principles of the disclosure and include common knowledge or conventional technical means in the technical field not disclosed in the disclosure. The description and the arrangements are only regarded as example, and the true scope and spirit of the disclosure are pointed out by the following claims.

It should be understood that the disclosure is not limited to the precise structure described above and shown in the drawings, and various modifications and changes can be made without departing from its scope. The scope of the disclosure is only limited by the appended claims.

It should be noted that in this disclosure, relational terms such as first and second are only used to distinguish one entity or operation from another entity or operation, and do not necessarily require or imply there is any such actual relationship or order between these entities or operations. The terms "include", "comprise", or any other variants thereof are intended to cover non-exclusive inclusion, so that a process, method, article or device that includes a series of elements includes not only those elements, but also other elements that are not explicitly listed, or also include elements inherent to such process, method, article, or device. If there are no more restrictions, the element defined by the sentence "including a . . . " does not exclude the existence of other identical elements in the process, method, article, or device that includes the element.

The methods and apparatuses provided by the arrangements of the present disclosure are described in detail above. Specific examples are used in this application to illustrate the principles and implementations of the present disclosure. The descriptions of the above arrangements are only used to help understand the methods of the present disclosure and core ideas thereof. At the same time, for those of ordinary skill in the art, according to the ideas of the present disclosure, there will be changes in the specific implementation and scope of application. In summary, the content of this specification should not be construed as a limitation on the present disclosure.

What is claimed is:

1. A method for allocating electronic resources, applied to a server, comprising:
   in response to receiving a first configuration request from a first client, configuring allocable electronic resources for a live streaming room, wherein the first configuration request is configured to indicate a first configuration operation performed by an anchor to the live streaming room, and the allocable electronic resources are associated to a target commodity corresponding to the live streaming room;
   acquiring an allocation request sent by a second client, wherein the allocation request is triggered by an interactive operation of an audience of the second client in the live streaming room;
   in response to the allocation request, allocating an electronic resource from the allocable electronic resources to the audience of the second client, wherein the allocated electronic resource is used by the audience for completing an order operation about the target commodity;
   acquiring a feature score of the audience, wherein the feature score is configured to indicate an expected return generated by the audience; and
   determining an expected allocation value of the electronic resource for the audience based on the feature score and a total value of the allocable electronic resources, wherein the expected allocation value is positively correlated with the feature score.

2. The method according to claim 1, wherein an interface of the first client comprises a configuration option for the live streaming room;
   wherein said in response to the first configuration request sent by the first client, configuring allocable electronic resources for the live streaming room comprises:
      receiving a first configuration request generated and sent by the first client based on first configuration operation performed by the anchor in the live streaming room through the configuration option; and
      in response to the first configuration request, configuring the allocable electronic resources for the live streaming room.

3. The method according to claim 1, further comprising:
sending allocation information corresponding to the allocable electronic resources to the second client, wherein the second client is configured to, in response to receiving the allocation information, output an interactive control in a live streaming interface of the live streaming room, and wherein the interactive control is configured to request allocation of the allocable electronic resources.

4. The method according to claim 3, wherein said acquiring the allocation request sent by the second client comprises:
acquiring the allocation request, in response to an interactive operation of the audience on the interactive control.

5. The method according to claim 2, wherein the allocable electronic resources comprise a limited-time effective coupon corresponding to the target commodity, and the first configuration operation comprises configuring a validity period of the limited-time effective coupon.

6. The method according to claim 1, wherein said allocating the electronic resource from the allocable electronic resources to the audience of the second client comprises:
allocating an electronic resource corresponding to the expected allocation value to the audience of the second client based on a timestamp of the allocation request, until all the allocable electronic resources are allocated.

7. The method according to claim 1, wherein said acquiring the feature score of the audience comprises:
acquiring the feature score by analyzing historical behavior data of the audience;
wherein the historical behavior data comprises live streaming participation records and/or commodity consumption records.

8. The method according to claim 1, further comprising:
in response to receiving a second configuration request from the first client, adjusting a total value of the allocable electronic resources that have been configured for the live streaming room,
wherein the second configuration request is configured to indicate a second configuration operation performed by the anchor to the live streaming room.

9. The method according to claim 8, further comprising:
sending adjustment information to the second client, wherein the adjustment information is configured to indicate adjustment of the total value of the allocable electronic resources.

10. A device for allocating electronic resources, applied to a server, comprising:
a processor;
memory for storing instructions executable by the processor;
wherein the processor is configured to:
configure allocable electronic resources for a live streaming room in response to receiving a first configuration request from a first client, wherein the first configuration request is configured to indicate a first configuration operation performed by an anchor to the live streaming room, and the allocable electronic resources are associated to a target commodity corresponding to the live streaming room;
acquire an allocation request sent by a second client, wherein the allocation request is triggered by an interactive operation of an audience of the second client in the live streaming room;
allocate an electronic resource from the allocable electronic resources to the audience of the second client in response to the allocation request, wherein the allocated electronic resource is used by the audience for completing an order operation about the target commodity;
acquire a feature score of the audience, wherein the feature score is configured to indicate an expected return generated by the audience; and
determine an expected allocation value of the electronic resource for the audience based on the feature score and a total value of the allocable electronic resources, wherein the expected allocation value is positively correlated with the feature score.

11. The device according to claim 10, wherein an interface of the first client comprises a configuration option for the live streaming room;
wherein the processor is configured to:
receive a first configuration request generated and sent by the first client based on first configuration operation performed by the anchor in the live streaming room through the configuration option; and
configure the allocable electronic resources for the live streaming room in response to the first configuration request.

12. The device according to claim 10, wherein the processor is further configured to:
send allocation information corresponding to the allocable electronic resources to the second client, wherein the second client is configured to, in response to receiving the allocation information, output an interactive control in a live streaming interface of the live streaming room, and wherein the interactive control is configured to request allocation of the allocable electronic resources.

13. The device according to claim 12, wherein the processor is configured to: acquire the allocation request, in response to an interactive operation of the audience on the interactive control.

14. The device according to claim 10, wherein the processor is further configured to:
adjust a total value of the allocable electronic resources that have been configured for the live streaming room, in response to receiving a second configuration request from the first client, wherein the second configuration request is configured to indicate a second configuration operation performed by the anchor to the live streaming room.

15. A non-transitory computer-readable medium comprising computer-readable instructions, such that, when executed, causes a processor to:
configure allocable electronic resources for a live streaming room in response to receiving a first configuration request from a first client, wherein the first configuration request is configured to indicate a first configuration operation performed by an anchor to the live streaming room, and the allocable electronic resources are associated to a target commodity corresponding to the live streaming room;
acquire an allocation request sent by a second client, wherein the allocation request is triggered by an interactive operation of an audience of the second client in the live streaming room;
allocate an electronic resource from the allocable electronic resources to the audience of the second client in response to the allocation request, wherein the allocated electronic resource is used by the audience for completing an order operation about the target commodity;

acquire a feature score of the audience, wherein the feature score is configured to indicate an expected return generated by the audience; and determine an expected allocation value of the electronic resource for the audience based on the feature score and a total value of the allocable electronic resources, wherein the expected allocation value is positively correlated with the feature score.

16. The non-transitory computer-readable medium according to claim 15, wherein an interface of the first client comprises a configuration option for the live streaming room;

wherein the processor is caused to:
receive a first configuration request generated and sent by the first client based on first configuration operation performed by the anchor in the live streaming room through the configuration option; and
configure the allocable electronic resources for the live streaming room in response to the first configuration request.

17. The non-transitory computer-readable medium according to claim 15, wherein the processor is further caused to:

send allocation information corresponding to the allocable electronic resources to the second client, wherein the second client is configured to, in response to receiving the allocation information, output an interactive control in a live streaming interface of the live streaming room, and wherein the interactive control is configured to request allocation of the allocable electronic resources.

18. The non-transitory computer-readable medium according to claim 17, wherein the processor is caused to: acquire the allocation request, in response to an interactive operation of the audience on the interactive control.

19. The non-transitory computer-readable medium according to claim 17, wherein said acquiring the feature score of the audience comprises:

acquiring the feature score by analyzing historical behavior data of the audience;

wherein the historical behavior data comprises live streaming participation records and/or commodity consumption records.

* * * * *